United States Patent
Juang

(10) Patent No.: US 6,178,804 B1
(45) Date of Patent: Jan. 30, 2001

(54) TOP DIE RAISING AND LOWERING GUIDE MECHANISM FOR PUNCHING, PRESSING, AND SHEARING MACHINES

(76) Inventor: Fwu-Shing Juang, No. 14, Lane 291, Shin-Te St., Pyng-Jenn City, Taoyuan (TW)

( * ) Notice: Under 35 U.S.C. 154(b), the term of this patent shall be extended for 0 days.

(21) Appl. No.: 09/350,306

(22) Filed: Jul. 9, 1999

(51) Int. Cl.⁷ ........................................................ B21J 9/12
(52) U.S. Cl. ................ 72/453.06; 72/455; 100/269.08; 100/269.1; 83/639.1; 83/639.5
(58) Field of Search .................... 72/455, 453.06, 72/453.08, 453.02; 100/214, 269.01, 269.03, 269.08, 269.1; 83/639.1, 639.5

(56) References Cited

U.S. PATENT DOCUMENTS

| | | | |
|---|---|---|---|
| 2,067,265 | * | 1/1937 | Ernst .................. 100/269.8 |
| 2,220,798 | * | 11/1940 | Dinzl .................. 100/269.8 |
| 2,300,162 | * | 10/1942 | Maude ................ 100/269.8 |
| 3,031,993 | * | 5/1962 | Gerard et al. ....... 72/453.06 |
| 3,034,425 | * | 5/1962 | Huetter ............... 72/453.02 |
| 3,704,644 | * | 12/1972 | Cloup ................. 83/639.5 |
| 3,797,298 | * | 3/1974 | Vasilkovsky et al. ... 72/453.06 |
| 4,125,010 | * | 11/1978 | Adam .................. 72/453.06 |
| 4,206,699 | * | 6/1980 | Hemmelgarn ....... 100/269.08 |
| 4,343,212 | * | 8/1982 | Hishinuma ........... 83/639.5 |
| 4,445,357 | * | 5/1984 | Powers et al. ....... 72/453.06 |
| 4,809,535 | * | 3/1989 | Ellis ................... 72/453.02 |

* cited by examiner

Primary Examiner—David Jones
(74) Attorney, Agent, or Firm—Rosenberg, Klein & Lee

(57) ABSTRACT

An improved top die raising and lowering guide mechanism for punching, pressing, and shearing machines having three hydraulic cylinder sets installed in a triangular configuration and, furthermore, three piston rod sets conjoined to an attachment mount to which is mounted a top die that is thereby guided during ascent and descent to execute punching, pressing, and shearing operations. The innovation of the present invention is that the top and bottom ends of the triangularly arranged three hydraulic cylinder sets are interconnected such that when a hydraulic system conveys hydraulic fluid to and from the top and bottom ends, the piston rods are simultaneously raised or lowered. The exposed lower ends of the three piston rod sets are conjoined to an attachment mount and the ascent and descent of the three piston rod sets is synchronized, stable, and provides equally distributed pressure and, based on the principles of plane triangular forms, the top die installed to the attachment mount is moved synchronously with the three piston rods to ascend and descend without flexion and twisting and, furthermore, in a stable and precise manner.

3 Claims, 9 Drawing Sheets

G-G

H-H

TOP DIE RAISING AND LOWERING GUIDE MECHANISM FOR PUNCHING, PRESSING, AND SHEARING MACHINES

BACKGROUND OF THE INVENTION

1) Field of the Invention

The invention herein relates to an improved top die raising and lowering guide mechanism for punching, pressing, and shearing machines.

2) Description of the Prior Art

In conventional punching, pressing, and shearing machines, the top die is typically raised and lowered, as indicated in FIG. 1, by a hydraulic system (hydraulic pump, not shown in the drawing) driving a single hydraulic cylinder 1 or a cam (not shown in the drawing) rotated by a motor (not shown in the drawing), with the said top die 2 pre-mounted to a guide block 3, and the guide block 3 is raised and lowered via an attachment block 4 driven by the piston rod 11 of the hydraulic cylinder 1 or a rotating cam; wherein, when the top die 2 on the said guide block 3 is raised or lowered by the hydraulic cylinder 1 piston rod 1 1, the piston rod 11 tends to twist since it is a freely rotating component or, in the case of the eccentric movement of a rotating cam, flexion occurs; as such, the machine A is normally equipped with a guide track 2 installed on two sides in which the two ends of guide block 3 slide and thereby accurately ascend and descend in a straight line.

The said guide block 3 and guide tracks 5 are produced in numerous arrangements and, as indicated in FIG. 2, the guide track 5 can consist of the three guide elements 51, 52, and 53 formed into a U-shaped fixture and, furthermore, the said left and right fixtures are respectively fastened to the two sides of the machine A, with the two projecting ends of the guide block 3 then each fitted into the two guide tracks 5 so they can slide in contact with them or, as indicated in FIG. 3, the left and right guide tracks 5 can be formed as a negative V-shaped profile and fastened to the two sides of the machine A and the guide block 3 ends machined to a positive V-shaped profile capable of sliding in them. Or, as indicated in FIG. 4, when utilized on a larger model machine, the left and right guide tracks 5 are formed from two guide elements 51 and each pair of guide elements 51 is respectively fastened to the two sides of the machine A, a locating block 31 is situated on each of the two sides of the guide block 3 ends, and a sliding block 32 is disposed in between the locating blocks 31 and the guide elements 51.

While utilizing the said guide block 2 and two guide tracks 5 in a sliding arrangement to raise and lower the top die 2 in a straight line is of practical value and provides functional performance and, furthermore, is the most commonly used type of guide mechanism on punching, pressing, and shearing machines, following long-term usage, the industry and users have become aware that the following shortcomings await improvement:

1. Since the installation of the said guide block 3 must take into consideration differences in machine size, especially in the case of larger units, and furthermore, the two ends must be precision machined and ground to fabricate smooth and even sliding surfaces, therefore, construction, finishing, and assembly is often troublesome, inconvenient, and more expensive in terms of production cost.

2. Since the said guide tracks 5 must provide for the raising and lowering of the guide blocks 3 in a straight line without flexion and twisting, precision construction and assembly is required to achieve the sliding of the guide block 3 that involves the shortcomings of difficult and time-consuming machining, and especially the necessity of adjusting them to the proper verticality on the machine A, which is troublesome, inconvenient, time-consuming, and difficult.

3. Since lubrication must be applied periodically between the said guide block 3 and guide tracks 5 to reduce friction, therefore, in addition to the general inconvenience and troublesome nature, the lubrication attracts dust and the accumulation often gives rise to thick build-ups of sludge, resulting in an untidy machine.

4. Since the said guide block 3 and guide tracks 5 are installed in an exposed state, therefore, they readily attract dust and debris that increases friction, with the wear after long-term operation causing drift and flexion during raising and lowering which reduces the punching, pressing, and shearing precision of the top die 2.

5. Given the said situations, to maintain the functional precision of the top die 2, the said guide block 3 and guide tracks 5 must be machined or replaced following a certain period of utilization, which not only involves disassembly, assembly, and re-machining, but is extremely troublesome and inconvenient and, furthermore, the said replacement operation is wasteful and uneconomical.

6. When the hydraulic system drives a single hydraulic cylinder and, furthermore, is utilized on a larger model machine, especially with regard to considerations of precision, the greater weight of the single hydraulic cylinder makes it more difficult to produce and, furthermore, troublesome (larger dimensioned hydraulic cylinder are more challenging to produce) and this results in uneconomical production overhead and, furthermore, the overall cost is higher when fabricating guide blocks 3 and guide tracks 5 capable of raising and lowering the top die 2.

In summation of the foregoing section, conventional guide blocks and guide tracks serving as mechanisms that guide the raising and lowering of the top die are of an impractical design having obvious shortcomings which require improvement.

SUMMARY OF THE INVENTION

The primary objective of the invention herein is to provide an improved top die raising and lowering guide mechanism for punching, pressing, and shearing machines having three sets of hydraulic cylinders installed in a triangular configuration and, furthermore, interconnected at the top end and bottom end, with each having a piston rod which is conjoined to an attachment mount on which is mounted a top die such that when the hydraulic system conveys hydraulic fluid to and from the top and bottom ends, the said three sets of piston rods are raised and lowered simultaneously, stably, and under equally distributed pressure and, furthermore, the top die is moved without flexion and twisting in a balanced, consistent, and precise manner.

Another objective of the invention herein is to provide an improved top die raising and lowering guide mechanism for punching, pressing, and shearing machines, in which the said top die is stably and precisely raised and lowered directly by three sets of piston rods and does not require the additional installation of an exposed guide block and guide tracks and, therefore, the present invention is more economical, convenient, and less difficult in terms of production, finishing, and assembly, especially since the complex, intricate, time-consuming, and troublesome task of adjusting the verticality of the conventional guide track is completely unnecessary.

Yet another objective of the invention herein is to provide an improved top die raising and lowering guide mechanism for punching, pressing, and shearing machines, wherein the three sets of piston rods on which the top die is guided upward and downward are concealed and retracted into the hydraulic cylinders during certain phases of operation, unlike conventional guide blocks and guide tracks that are always exposed, and as such do not require the applying of lubrication and, therefore, do not attract dust, which not only provides for operating convenience, but does not give rise to sludge build-up that has to be cleaned and, of course, this improvement eliminates the frictional wear that occurs in the conventional mechanisms.

Still another objective of the invention herein is to provide an improved top die raising and lowering guide mechanism for punching, pressing, and shearing machines, wherein the said three hydraulic cylinder sets are installed in a triangular configuration and the said three piston rod sets are secured to the attachment mount such that based on the principles of plane triangular forms, the top die positioned on the attachment mount ascends and descends without twisting and flexion in a manner that offers optimal stability and precision; furthermore, in terms of productivity, the said three hydraulic cylinder sets are a feasible replacement for single hydraulic cylinder arrangements and obviously is a genuine improvement over the troublesome, more complex, and higher production cost large dimensioned hydraulic cylinders.

Still another objective of the invention herein is to provide an improved top die raising and lowering guide mechanism for punching, pressing, and shearing machines, wherein a minimum one hydraulic cylinder is utilized in each said set of hydraulic cylinders, with the exact number of hydraulic cylinders in each hydraulic cylinder set determined by the extent of machine driving power which thereby enables easier, more convenient, and more economical production.

To enable the examination committee to further understand the objectives, innovations, and functions of the present invention, the brief description of the drawings below are followed by the detailed description of the preferred embodiments.

DETAILED DESCRIPTION OF THE PREFERRED EMBODIMENTS

Figure 1:
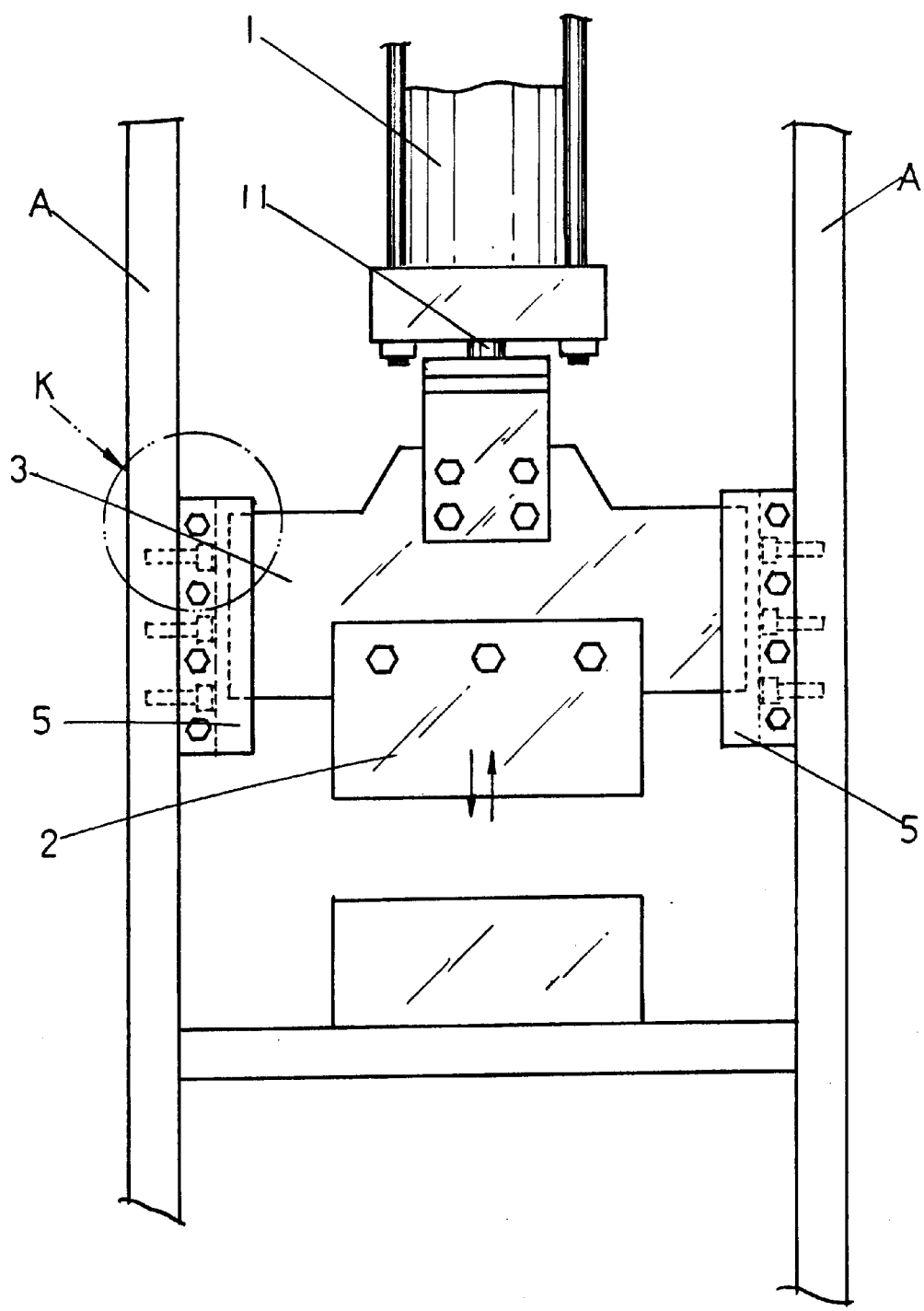
FIG. 1 is an orthographic drawing of a conventional top die raising and lowering guide mechanism of a punching, pressing, and shearing machine.
Figure 3:
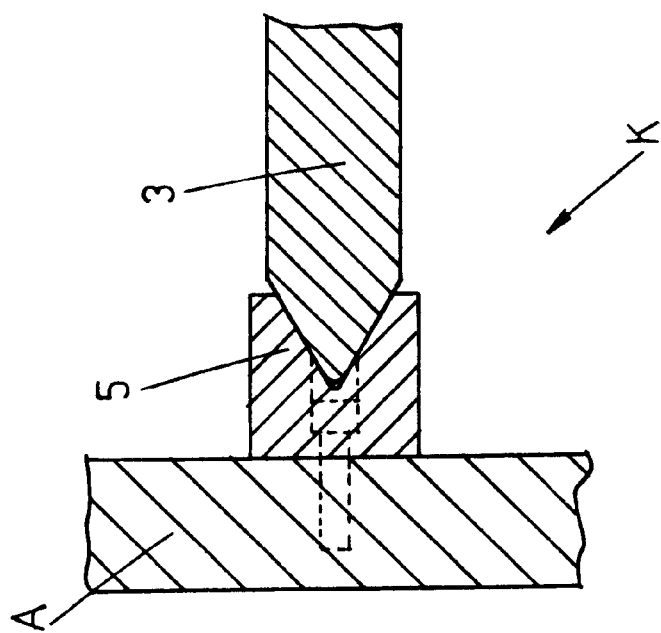
FIG. 3 is a cross-sectional drawing of the guide mechanism (Type 2) in FIG. 1, as viewed from a top perspective.
Figure 2:
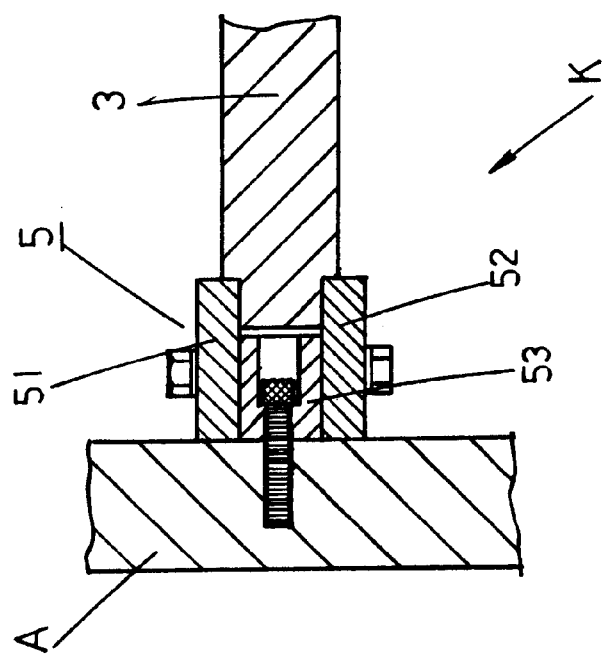
FIG. 2 is a cross-sectional drawing of the guide mechanism (Type 1) in FIG. 1, as viewed from a top perspective.
Figure 4:
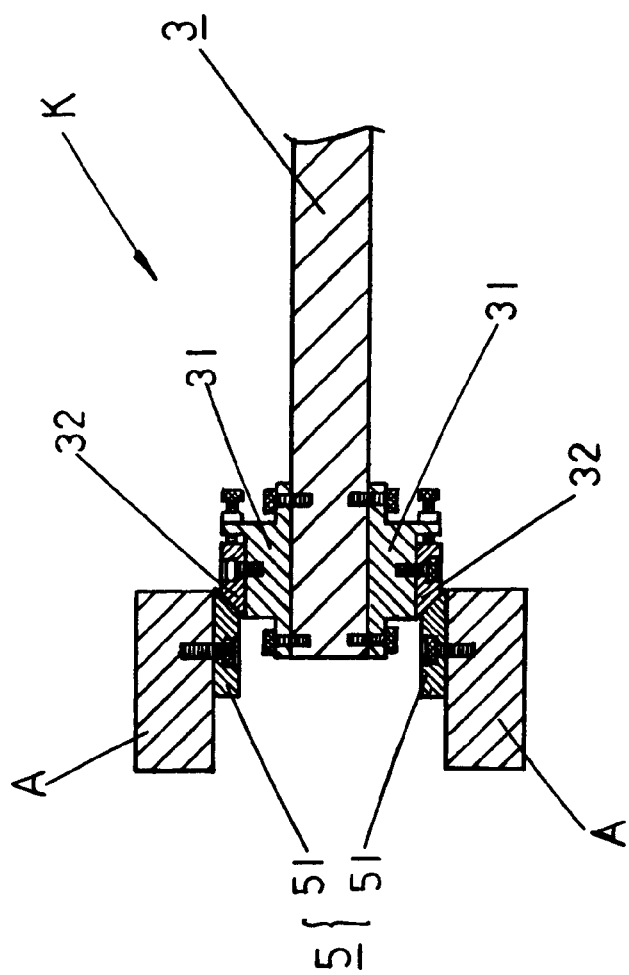
FIG. 4 is a cross-sectional drawing of the guide mechanism (Type 3) in FIG. 1, as viewed from a top perspective.
Figure 5:
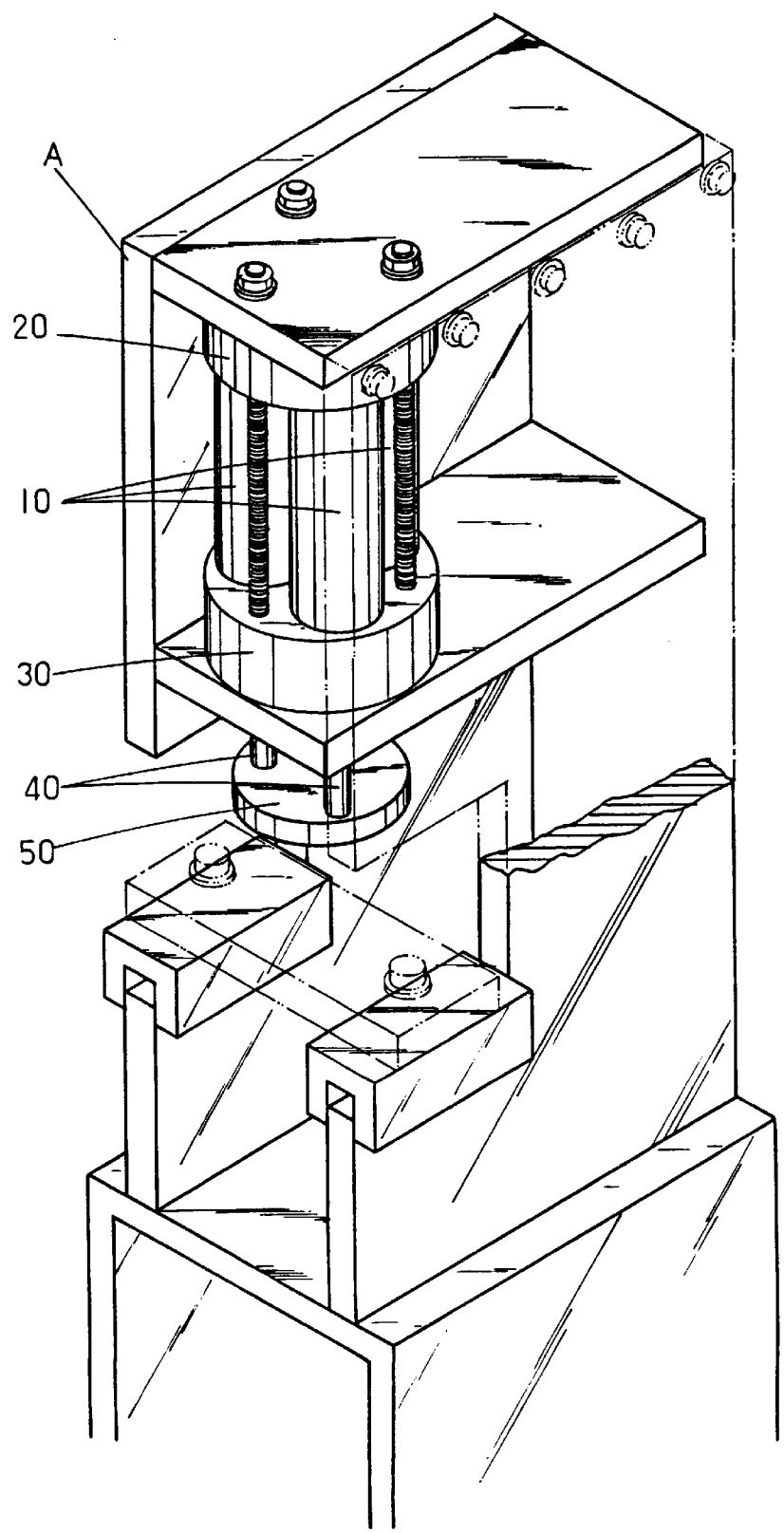
FIG. 5 is an isometric drawing of an embodiment of the invention herein.
Figure 6:
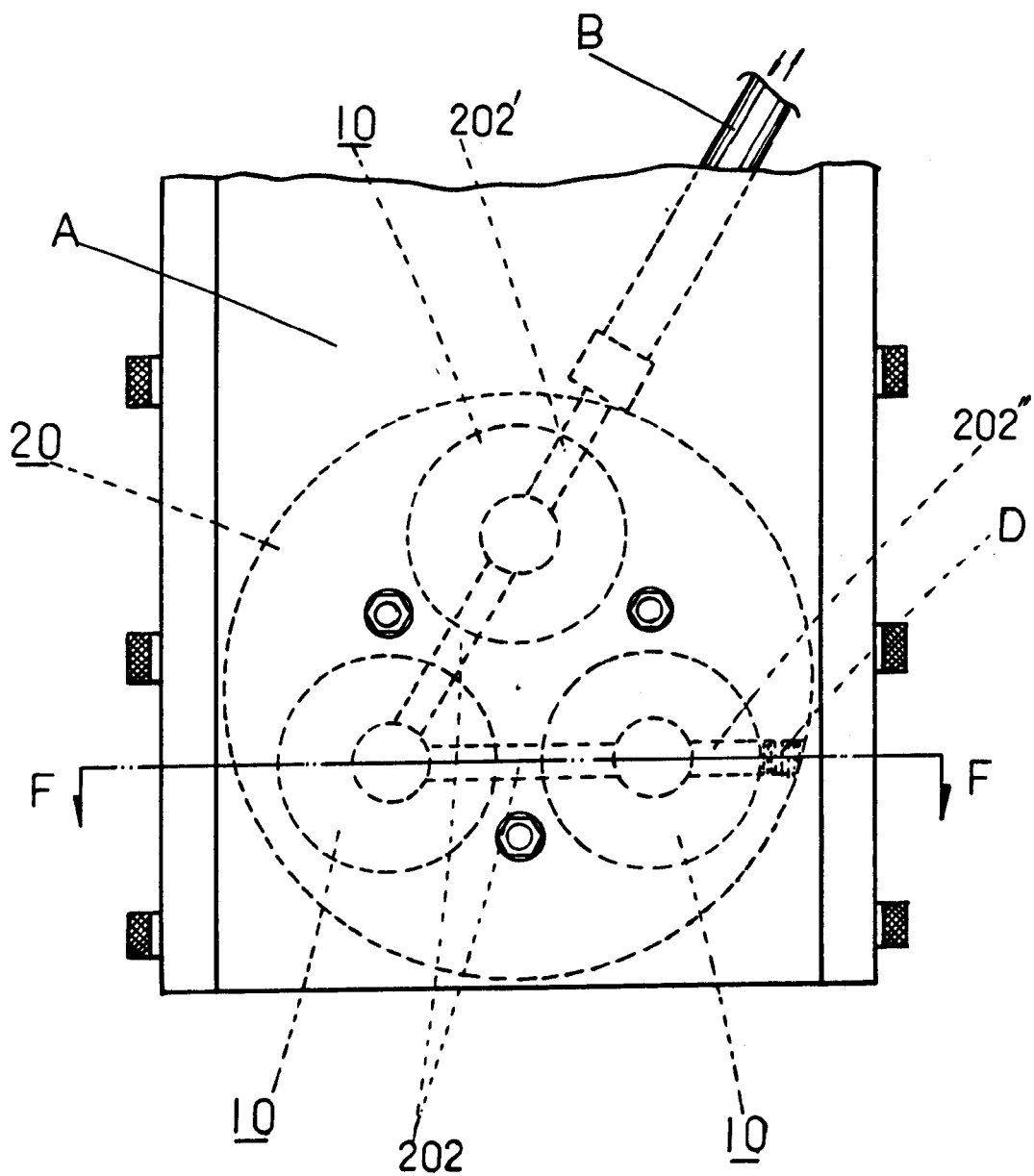
FIG. 6 is an orthographic drawing of an embodiment of the invention herein, as viewed from a top perspective.
Figure 7:
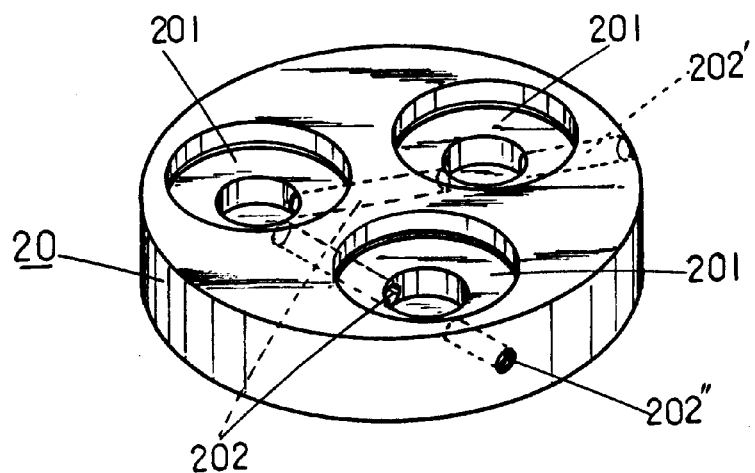
FIG. 7 is an isometric drawing of the upper locating seat of the invention herein.
Figure 8:
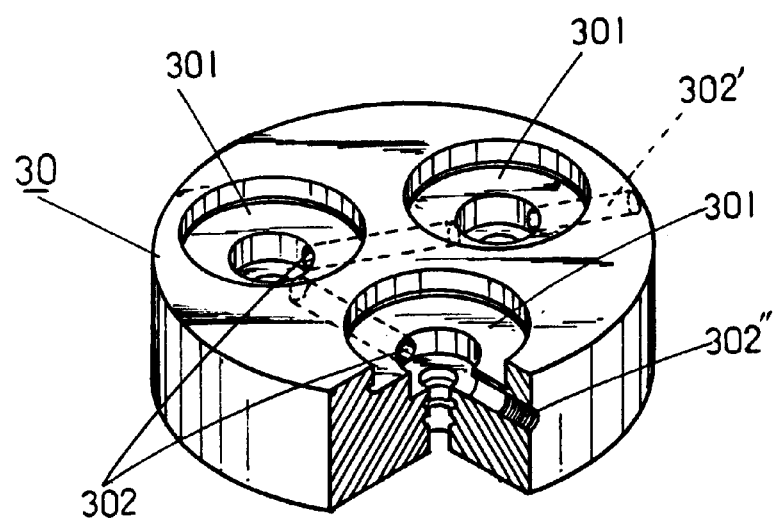
FIG. 8 is an isometric drawing of the lower locating seat of the invention herein.

Referring to FIG. 5 and FIG. 6, the improved top die raising and lowering guide mechanism for punching, pressing, and shearing machines of the invention herein is comprised of three sets of hydraulic cylinders 10 installed at the upper extent of the machine A and the said three sets of hydraulic cylinders 10 are installed in a triangular configuration, with the locating seats 20 and 30 installed to the top end and the bottom end, respectively. Of which, there must be a minimum one hydraulic cylinder in each set of hydraulic cylinders 10, with each set having the same number hydraulic cylinders and the sets positioned at an included angle of 60 degrees apart in the form of an equilateral triangle as the most optimal arrangement.

The number of hydraulic cylinders in each hydraulic cylinder 10 set is determined by power requirements of the machine and the actual degree of operating convenience, difficulty, and economic performance expected of the hydraulic cylinders.

In the description of the present invention below, the embodiment elaborated has only one hydraulic cylinder per set of hydraulic cylinders.

Referring to FIG. 7, FIG. 8, FIG. 9, FIG. 10, and FIG. 11, the upper and lower locating seats 20 and 30 installed on the machine A have the recessed holes 201 and 301 formed in the bottom surface and the top surface, respectively, that provides for the mounting of each hydraulic cylinder 10 set which, in conjunction with the relief rings 2011 and 3011, enables installation to the top ends and bottom ends of the hydraulic cylinder 10 sets, and there are the oil passages 202 and 302 interconnecting the recessed holes 201 and 301, wherein the oil passages 202' and 302' lead to the external oil feed lines B and C of the hydraulic system (hydraulic pump) which carries hydraulic fluid to and from the three hydraulic cylinder 10 sets. Of which, to facilitate fabrication convenience and ease, the said oil passages 202 and 302 are interconnected by drilling which in addition to drilling the holes 202' and 302' provided for the hydraulic system oil feed lines B and C also includes the drilling of the holes 202" and 302" and, furthermore, routing them directly to the exterior for the oil stop screws D and E (see FIG. 6, FIG. 10, and FIG. 11). Of course, there are many methods of fabricating the said oil passages 202 and 302 and the foregoing approach is only cited as a single example, and fabrication can be achieved in number of other feasible ways.

Figure 9:
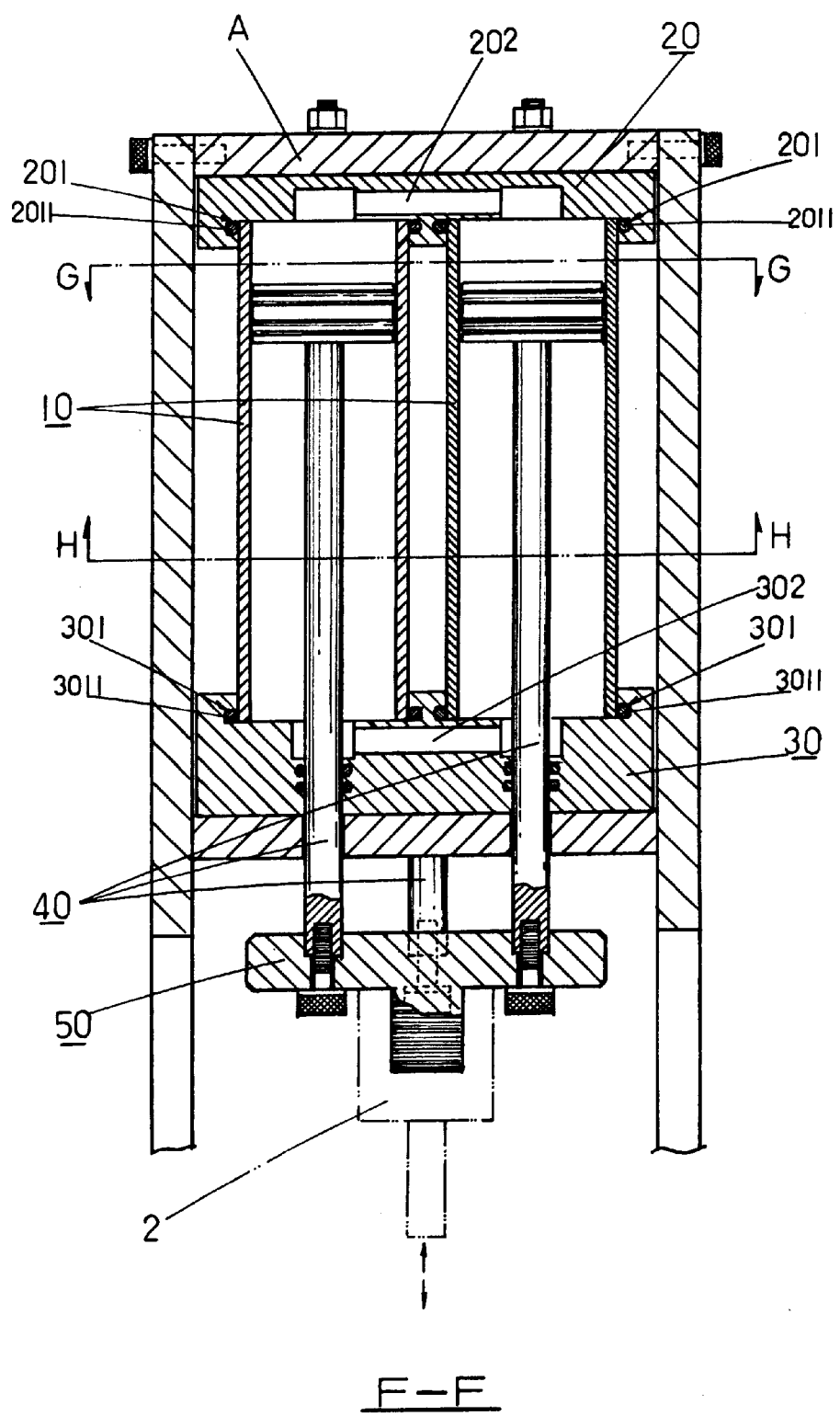
FIG. 9 is a cross-sectional drawing of the invention herein, as viewed from the perspective of line F—F in FIG. 6.
Figure 10:
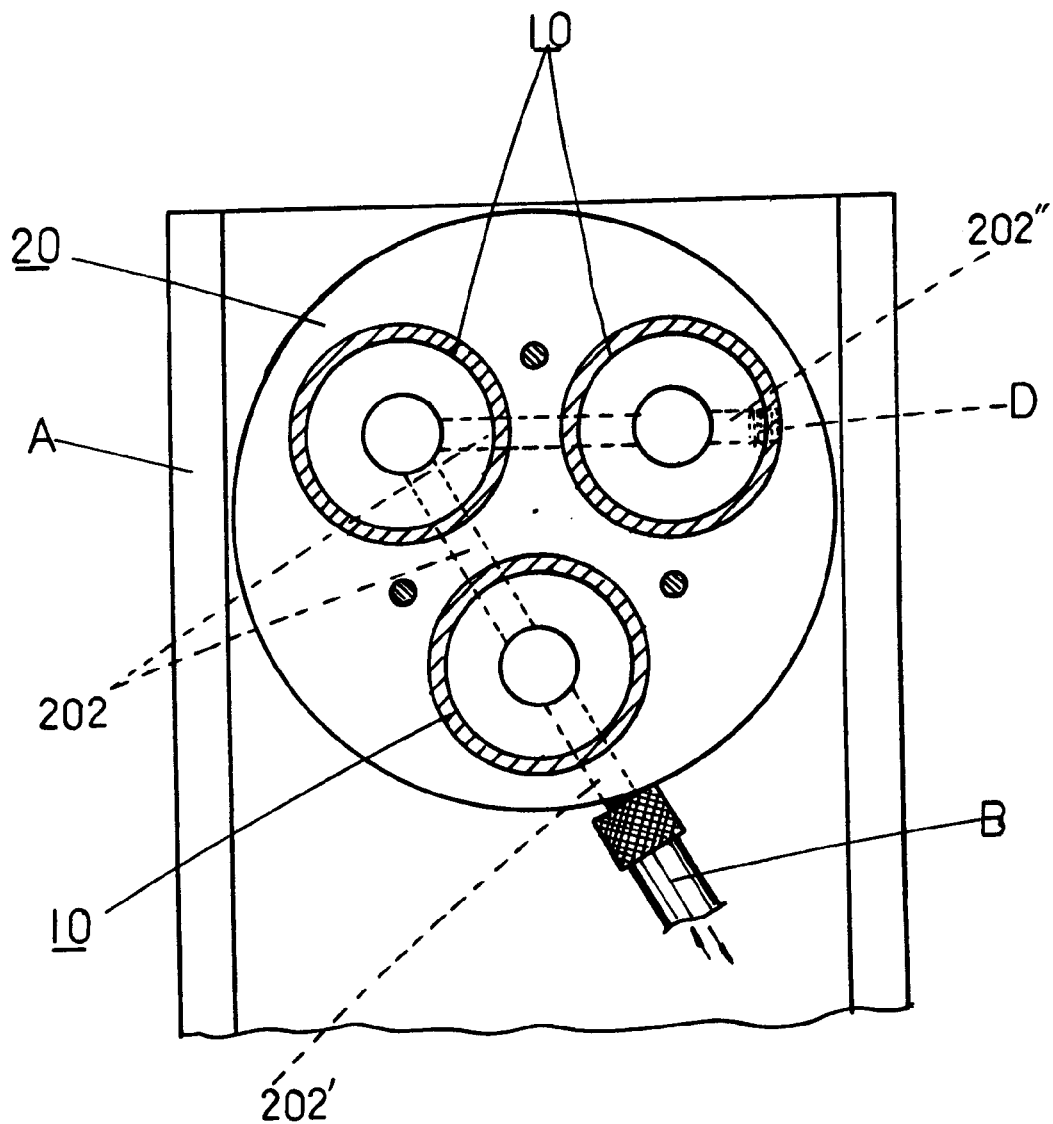
FIG. 10 is a cross-sectional drawing of the invention herein, as viewed from the perspective of line G—G in FIG. 6.
Figure 11:
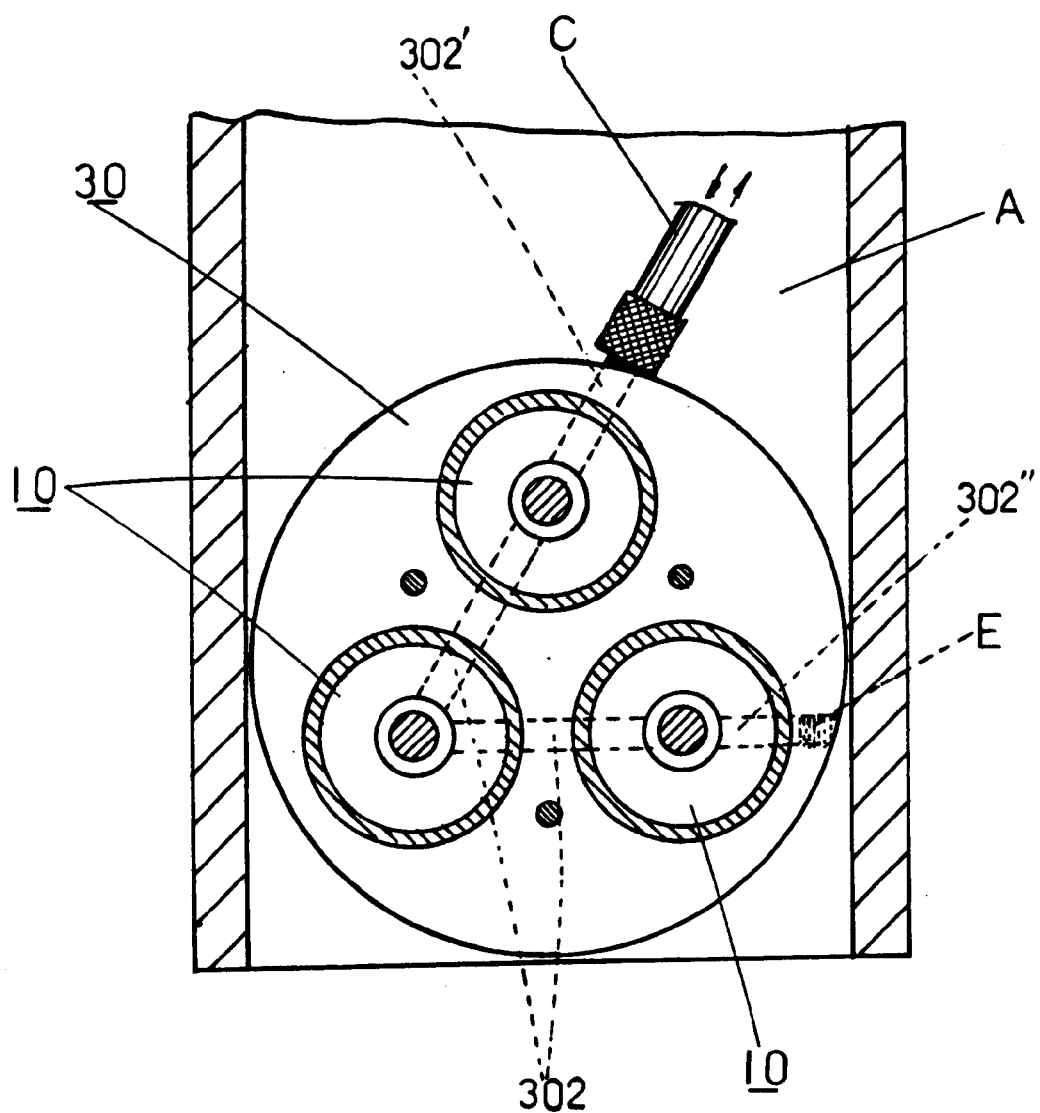
FIG. 11 is a cross-sectional drawing of the invention herein, as viewed from the perspective of line H—H in FIG. 6.

Referring to FIG. 5 and FIG. 9, the exposed ends of the piston rods 40 of the said three hydraulic cylinder 10 sets are conjoined to an attachment mount 50 and a top die 2 is installed to the said attachment mount 50; as such, when the hydraulic system fluid is conveyed to the top and bottom ends of the three hydraulic cylinder 10 sets, the said attachment mount 50 and top die 2 are driven up and down by the three sets of piston rods 40.

Since the three hydraulic cylinder 10 sets of the invention herein are installed in a triangular configuration and their respective piston rods 40 are conjoined to the attachment mount 50, based on the principles of a plane triangular forms, when the said attachment mount 50 is driven downward by the triangularly disposed piston rods 40, the resulting motion is positionally stable and precise with no flexion or twisting, with the stable and precision characteristics also transferred to the top die 2 installed to the attachment mount 50.

Furthermore, since the oil passages 202 and 302 formed in the upper and lower locating seats 20 and 30 at the top and bottom ends of the said three hydraulic cylinder 10 sets are in an interconnected state, therefore, when hydraulic system fluid is delivered to the oil passages 202' and 302' in the upper and lower locating seats 20 and 30, the said three sets of piston rods 40 are driven into motion; and with the attachment mount 50 conjoined to the exposed ends of the three piston rod 40 sets and thereby in a unitary structural state, when hydraulic system fluid is delivered to and from the upper and lower oil passages 202 and 302, the said three sets of piston rods 40 ascend and descend simultaneously and, furthermore the top die 2 of the attachment mount 50 is thereby stably raised and lowered as direct result of the process.

Therefore, the said structure of the invention herein provides at minimum the following advantages:

1. Since the said three hydraulic cylinder sets are capable of yielding an equally distributed driving force and even though the force produced per hydraulic cylinder is less than that of a single hydraulic cylinder of similar volume, less space is occupied and, furthermore, the present invention has the advantage of simpler, more convenient, and more economical production.

2. Since the three sets of piston rods are installed in a triangular configuration, there is no flexion or twisting as force is directed from them against the top die and, furthermore, raising and lowering under the equally distributed pressure is stable and aligned, providing an effective improvement over conventional machines that are additionally equipped during production with guide blocks and guide tracks which are troublesome to adjust, inconvenient, time-consuming to set-up, and uneconomical.

3. Since the said attachment mount and top die ascend and descend in a guided manner by means of three sets of piston rods that are completely hidden in the hydraulic cylinders at full ascent, unlike conventional guide blocks and guide tracks which remain exposed, no application of lubrication is required at all and dust accumulation does not occur, which facilitates operating convenience, while also eliminating the necessity of cleaning any resulting oil sludge.

4. Since the said attachment mount and top die are driven directly by the three sets of piston rods to ascend and descend precisely without twisting, flexion, and drifting, the invention herein is a genuine improvement over conventional guide blocks and guide tracks that require re-machining or replacement due to wear caused by continuous friction.

What is claimed is:

1. An improved top die raising and lowering guide mechanism for punching, pressing, and shearing machines comprised of three sets of hydraulic cylinders installed in a triangular configuration at the upper extent of a punching, pressing, or shearing machine, with upper and lower locating seats mounted to the top and bottom ends, respectively, of the said hydraulic cylinder sets in the said machine; and formed inside the said upper and lower locating seats are oil passages connected to the said three hydraulic cylinder sets and said upper and lower oil passages connected to the respective oil feed lines of a hydraulic system which carries hydraulic fluid simultaneously to and from each of the said hydraulic cylinders; furthermore, the exposed ends of the piston rods of the said three hydraulic cylinder sets are conjoined to an attachment mount, and since the said piston rods are conjoined to the said attachment mount in a triangular configuration based on the principles of a plane triangular forms, the said attachment mount provides for the mounting of a top die which is raised and lowered as driven by the said three of piston rods sets.

2. As mentioned in claim 1 of the improved top die raising and lowering guide mechanism for punching, pressing, and shearing machines of the invention herein, there must be a minimum one hydraulic cylinder in each said set of hydraulic cylinders, with each set having the same number of hydraulic cylinders.

3. As mentioned in claim 2 of the improved top die raising and lowering guide mechanism for punching, pressing, and shearing machines of the invention herein, the said three sets of hydraulic cylinders installed in a triangular configuration are positioned at an included angle 60 degrees apart in the form of an equilateral triangle as the most optimal arrangement.

* * * * *